United States Patent
Mazzocco et al.

(10) Patent No.: US 9,958,195 B2
(45) Date of Patent: May 1, 2018

(54) HEAT EXCHANGER HAVING PARTITION

(71) Applicant: DENSO International America, Inc., Southfield, MI (US)

(72) Inventors: Nicholas Mazzocco, Clawson, MI (US); James Stander, W. Bloomfield, MI (US); William Cochran, Madison Heights, MI (US)

(73) Assignee: DENSO International America, Inc., Southfield, MI (US)

( * ) Notice: Subject to any disclaimer, the term of this patent is extended or adjusted under 35 U.S.C. 154(b) by 151 days.

(21) Appl. No.: 14/840,135

(22) Filed: Aug. 31, 2015

(65) Prior Publication Data

US 2017/0059230 A1  Mar. 2, 2017

(51) Int. Cl.

| | |
|---|---|
| F25D 21/14 | (2006.01) |
| B60H 1/00 | (2006.01) |
| F25B 39/02 | (2006.01) |
| F28F 9/22 | (2006.01) |
| F28F 17/00 | (2006.01) |
| F28D 1/04 | (2006.01) |
| F28D 1/053 | (2006.01) |
| F28F 1/12 | (2006.01) |
| B60H 1/32 | (2006.01) |
| F28D 21/00 | (2006.01) |

(52) U.S. Cl.
CPC .......... *F25D 21/14* (2013.01); *B60H 1/00328* (2013.01); *B60H 1/3233* (2013.01); *F25B 39/022* (2013.01); *F28D 1/0417* (2013.01); *F28D 1/05366* (2013.01); *F28D 1/05391* (2013.01); *F28F 1/126* (2013.01); *F28F 9/22* (2013.01); *F28F 17/005* (2013.01); *B60H 2001/00135* (2013.01); *F28D 2021/0085* (2013.01); *F28F 2009/226* (2013.01)

(58) Field of Classification Search
CPC .......... F28F 17/005; F28F 17/00; F28F 13/04; F28F 2009/226; B60H 1/00328; B60H 1/3233; B60H 2001/00135; F25D 21/14; F28D 1/0417
See application file for complete search history.

(56) References Cited

U.S. PATENT DOCUMENTS

| | | | |
|---|---|---|---|
| 6,308,527 B1 | 10/2001 | Kuroyanagi et al. | |
| 6,308,770 B1 | 10/2001 | Shikata et al. | |
| 2010/0273411 A1* | 10/2010 | Kakizaki | B60H 1/00064 454/159 |
| 2011/0005707 A1 | 1/2011 | Seto | |
| 2011/0005708 A1* | 1/2011 | Seto | B60H 1/00064 165/41 |
| 2011/0005715 A1 | 1/2011 | Seto et al. | |
| 2011/0005718 A1 | 1/2011 | Seto et al. | |

(Continued)

FOREIGN PATENT DOCUMENTS

| | | |
|---|---|---|
| JP | H10278547 A | 10/1998 |
| JP | 2002090083 A | 3/2002 |

*Primary Examiner* — Frantz Jules
*Assistant Examiner* — Lionel Nouketcha (57) ABSTRACT

A heat exchanger includes multiple tubes, multiple fins, and a partition wall. The multiple fins are stacked alternately with the tubes to form a core including a first section and a second section. The partition wall partitions between the first section and the second section. The first section has multiple drain passages in the vicinity of the partition wall.

11 Claims, 8 Drawing Sheets

(56) References Cited

U.S. PATENT DOCUMENTS

2011/0088880 A1* 4/2011 Seto .................. B60H 1/00328
165/151
2013/0306280 A1* 11/2013 Goodman ................ F28F 1/12
165/109.1

* cited by examiner

HEAT EXCHANGER HAVING PARTITION

TECHNICAL FIELD

The present disclosure relates to a heat exchanger having a partition.

BACKGROUND

A vehicle is generally equipped with an air conditioner having a refrigerant cycle. The refrigerant cycle generally includes an evaporator for cooling air drawn into a cabin of the vehicle. It may be demanded to provide individually conditioned air to a front compartment and a rear compartment in the vehicle at different conditions such as different temperatures.

SUMMARY

According to an aspect of the disclosure, a heat exchanger comprises a plurality of tubes. The heat exchanger further comprises a plurality of fins stacked alternately with the tubes to form a core including a first section and a second section. The heat exchanger further comprises a partition wall partitioning between the first section and the second section. The first section has a plurality of drain passages in the vicinity of the partition wall.

According to another aspect of the disclosure, a heat exchanger comprises a plurality of tubes. The heat exchanger further comprises a plurality of fins stacked alternately with the tubes to form a core including a first section and a second section. The heat exchanger further comprises a partition wall partitioning between the first section and the second section. The first section has drain passages. The drain passages has a width. The width is greater than a fin pitch of the fins.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, a first embodiment of the present disclosure will be described with reference to drawings. In the description, a lateral direction is along an arrow represented by "LATERAL" in drawing(s). A vertical direction is along an arrow represented by "VERTICAL" in drawing(s). A depth direction is along an arrow represented by "DEPTH" in drawing(s). A thickness direction is along an arrow represented by "THICKNESS" in drawing(s). A length direction is along an arrow represented by "LENGTH" in drawing(s). A width direction is along an arrow represented by "WIDTH" in drawing(s).

Figure 1:
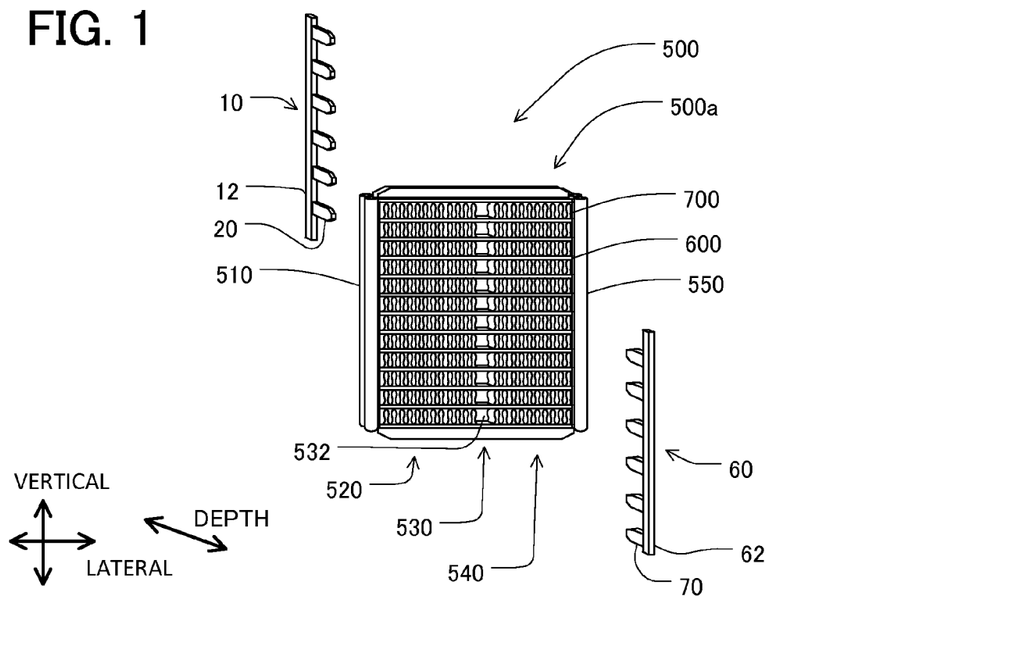
FIG. 1 is a perspective view showing a core and inserts.

As shown in FIG. 1, an evaporator 500 (heat exchanger) includes tanks 510 and 550, multiple tubes 600, and multiple fins 700. The tanks 510 and 550, the tubes 600, and the fins 700 are integrated with each other and brazed into one component. The evaporator 500 functions as a component of a refrigerant cycle to circulate a thermal medium, such as $CO_2$, therethrough. The refrigerant cycle includes, for example, the evaporator 500, a thermal expansion valve, a compressor, and a condenser (none shown), which are connected with each other via unillustrated pipes. The tank 510 includes an inlet and an outlet (none shown). The inlet is connected with the thermal expansion valve via a pipe. The outlet is connected with the compressor via a pipe.

The tubes 600 and the fins 700 are stacked alternately in the vertical direction to form a core 500a. The alternately stacked tubes 600 and fins 700 are interposed between the tanks 510 and 550 at both ends. One ends of the tubes 600 on the first side are inserted into the tank 510 and communicated with a fluid space formed in the tank 510. The other ends of the tubes 600 are inserted into the tank 550 and communicated with a fluid space formed in the tank 550. Thus, the tank 510, the tubes 600, and the tank 550 form a fluid passage to flow the thermal medium therethrough.

Each of the fins 700 is extended in the lateral direction and is interposed between adjacent tubes 600 in the vertical direction. The fin 700 and the adjacent tubes 600 form air passages to flow air therethrough. The fins 700 enhance a performance of heat exchange between the thermal medium, which flows through the tubes 600, with air, which passes through the air passages.

The core 500a includes a first section 520, an intermediate section 530, and a second section 540. The intermediate section 530 is located between the first section 520 and the second section 540. Each fin 700 of the first section 520 extends rightward from its first end toward the intermediate section 530. Each fin 700 of the second section 540 extends from its second end leftward to the intermediate section 530. Thus, each fin 700 of the first section 520 and the corresponding fin 700 of the second section 540 form a clearance 532 therebetween in the lateral direction. The fins 700 of the first section 520 stacked in the vertical direction and the fins 700 of the second section 540 stacked in the vertical direction form the clearances 532, which are linearly arranged in the vertical direction.

The evaporator 500 is equipped with a fore insert (first insert) 10 and a rear insert (second insert) 60 to partition the evaporator 500 into the first section 520 and the second section 540. In FIG. 1, the inserts 10 and 60 are to be inserted into the clearances 532 between the first section 520 and the second section 540. The fore insert 10 includes multiple blades (first blades) 20 extended from a base 12. The blades 20 are to be inserted into the clearances 532, respectively. The rear insert 60 also includes multiple blades (second blades) 70 extended from a base 62. The blades 70 are to be inserted into the clearances 532, respectively. The fore insert 10 may be identical to the rear insert 60.

The fore insert 10 is inserted into the evaporator 500 from an upstream side of airflow, and the rear insert 60 is inserted into the evaporator 500 from a downstream side of airflow. The width of each blade 20 may be partially or entirely greater than the width or the corresponding clearance 532 to enable insertion of the blade 20 resiliently or frictionally.

Figure 2:
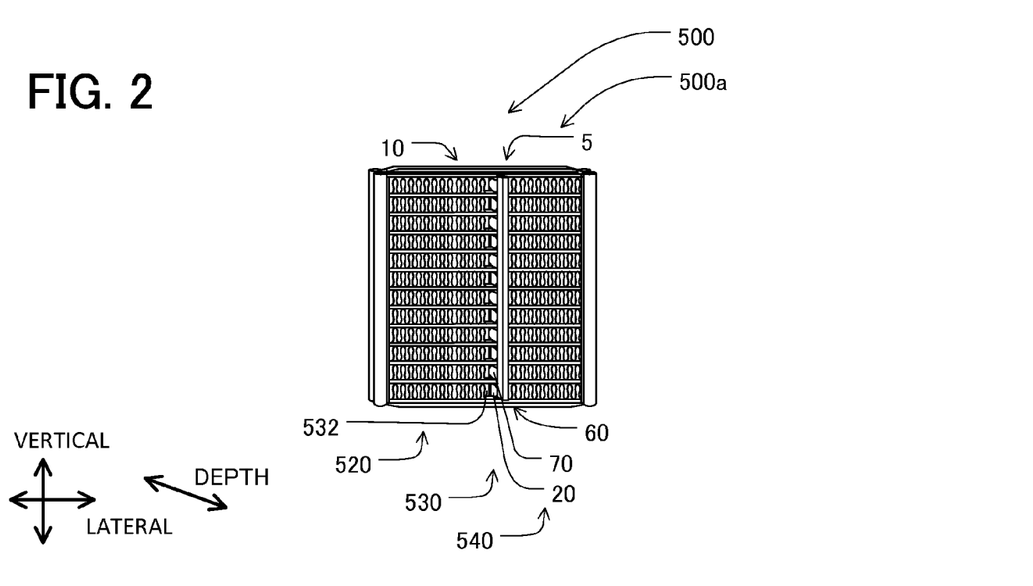
FIG. 2 is a schematic view showing the core equipped with the inserts.

As shown in FIG. 2, the core is equipped with the inserts 10 and 60 to form the evaporator 500. Each blade 20 and 70 is inserted into the corresponding clearance 532. Thus, each blade 20 and 70 is interposed between adjacent two tubes 600.

The inserts 10 and 60 form a partition wall 5 to partition the core 500a into the first section 520 and the second section 540. The comb-shaped fore insert 10 and the comb-shaped rear insert 60 are opposed to each other in the depth direction. The blades 20 of the fore insert 10 and the blades 70 of the rear insert 60 are arranged alternately and located substantially at the same level in the vertical direction. The partition wall 5 is located around the center of the core 500a.

Figure 3:
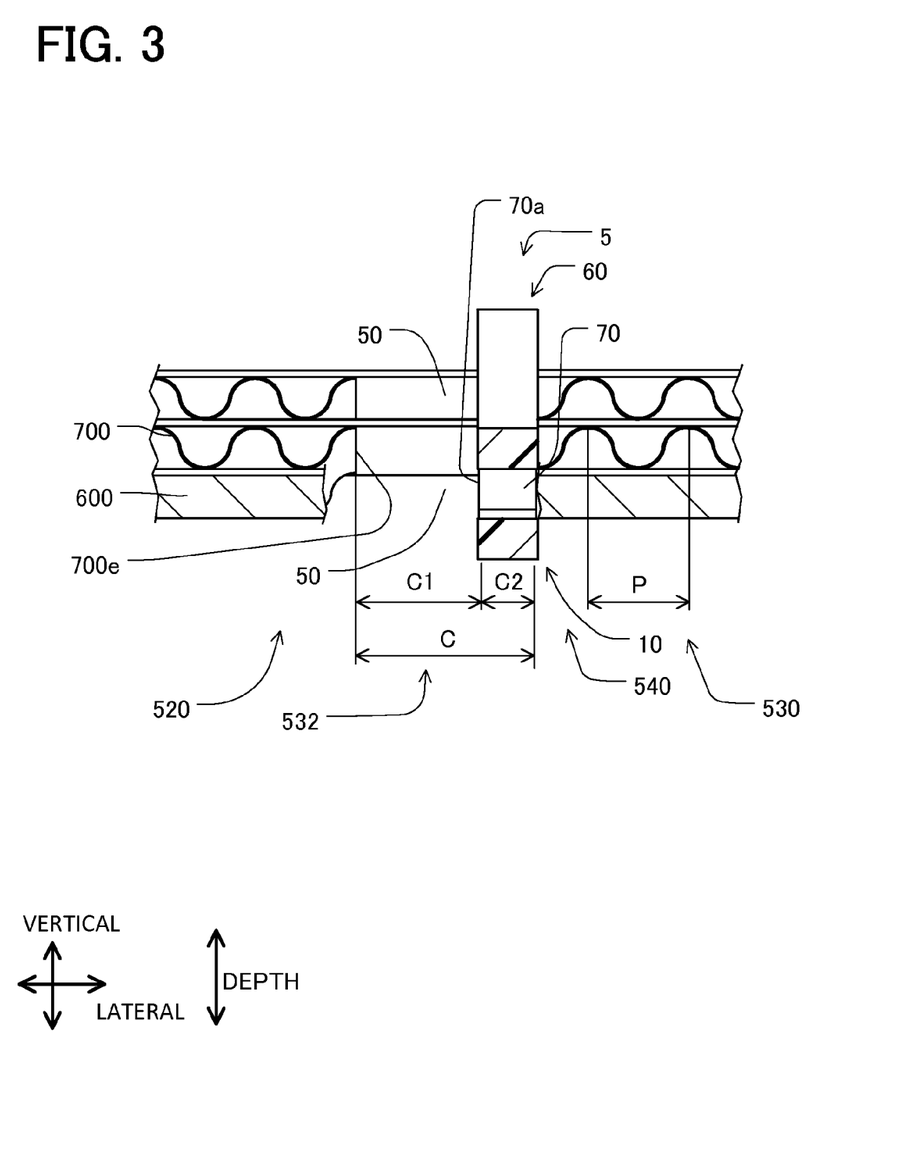
FIG. 3 is a schematic sectional view showing a portion of an evaporator.

As shown in FIG. 3, the clearance 532 originally has the width C in the lateral direction. The blade 20 of the insert 10 has the width C2 and occupies a portion of the clearance 532. The blade 70 of the insert 60 has the width C2 and occupies a portion of the clearance 532. Thus, the clearance 532 is reduced by the width C2 of the blade 20 and 70. The clearance 532 still forms a drain passage 50 in the vicinity of the partition wall 5. The drain passage 50 has the width C1 (C1=C−C2). The width C1 may be the length between the lateral side 70a of the blade 70 and a fin end 700e of the fin 700. The width C1 may be greater than a fin pitch P of the fin 700. The fin pitch P is a length between adjacent two peaks (two centers) of the fin 700. The drain passage 50 is adjacent to the blade 70. The inserts 10 and 60 form the partition wall 5 to partition the drain passage 50 from the second section 540. The tube 600 is exposed on the side of the drain passage 50, without being in contact with the fin 700. Two tubes 600, which are adjacent to each other, the partition wall 5, and the end of the fin 700 define the drain passage 50. The drain passages 50 and the tubes 600 are arranged alternately in the vertical direction. The fin 700 and the tube 600 form an air passage, and the drain passage 50 is in a shape difference from a shape of the air passage.

Figure 4:
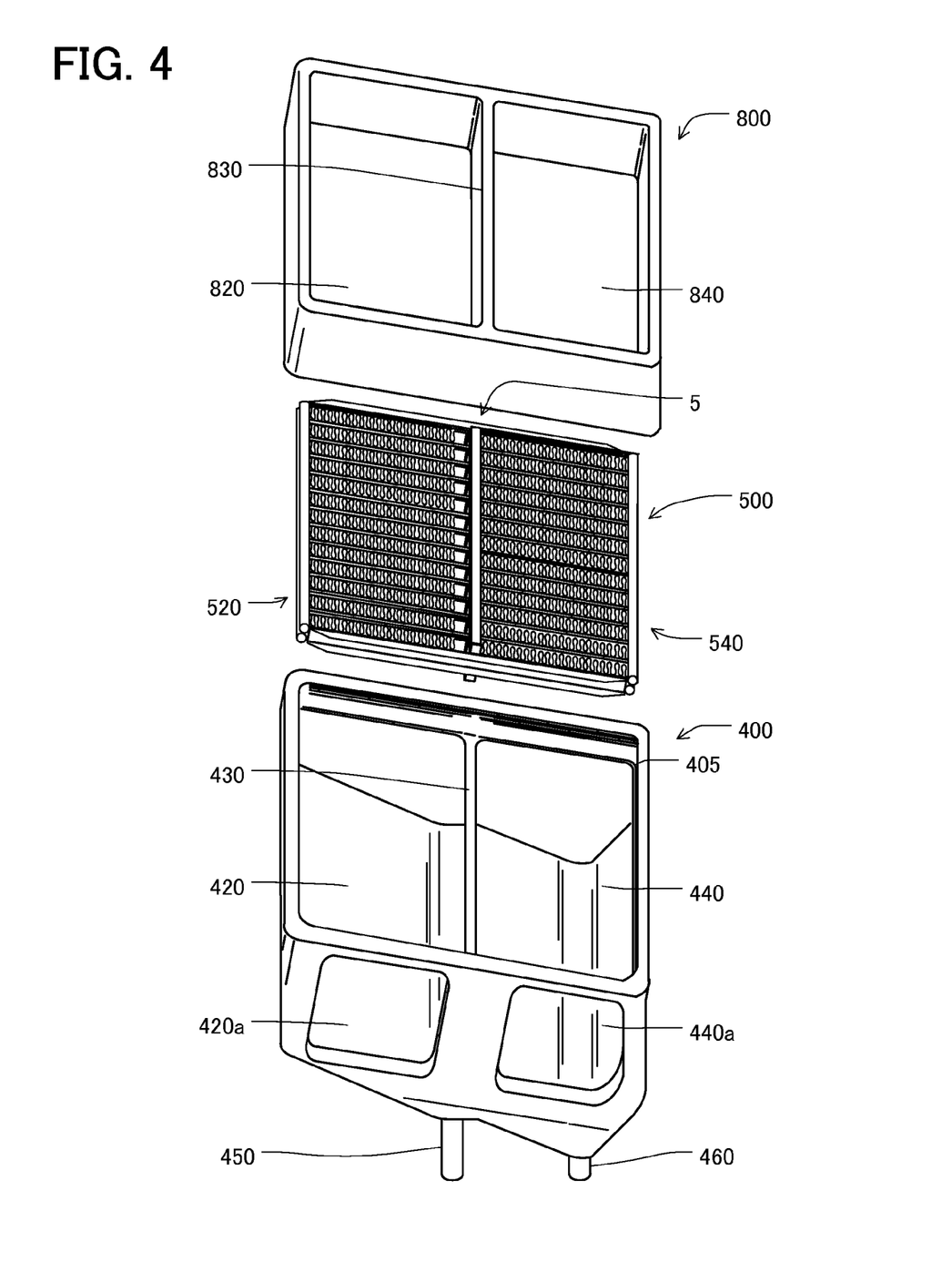
FIG. 4 is a perspective exploded view showing the evaporator, a case, and a passage member.

As shown in FIG. 4, a case 400 is a hollow vessel having a first partition 430 to separate the interior of the case 400 into a first passage 420 and a second passage 440. The case 400 has a side wall having a first inlet 420a and a second inlet 440a, which are communicated with the first passage 420 and the second passage 440, respectively. The case 400 has a bottom wall equipped with a first tube 450 and a second tube 460, which are communicated with the first passage 420 and the second passage 440, respectively. The case may have a step 405 at the same level as the upper surface of the first partition 430.

A passage member 800 is a hollow tubular member having a partition 830 to separate the interior of the passage member 800 into a first passage 820 and a second passage 880.

Figure 5:
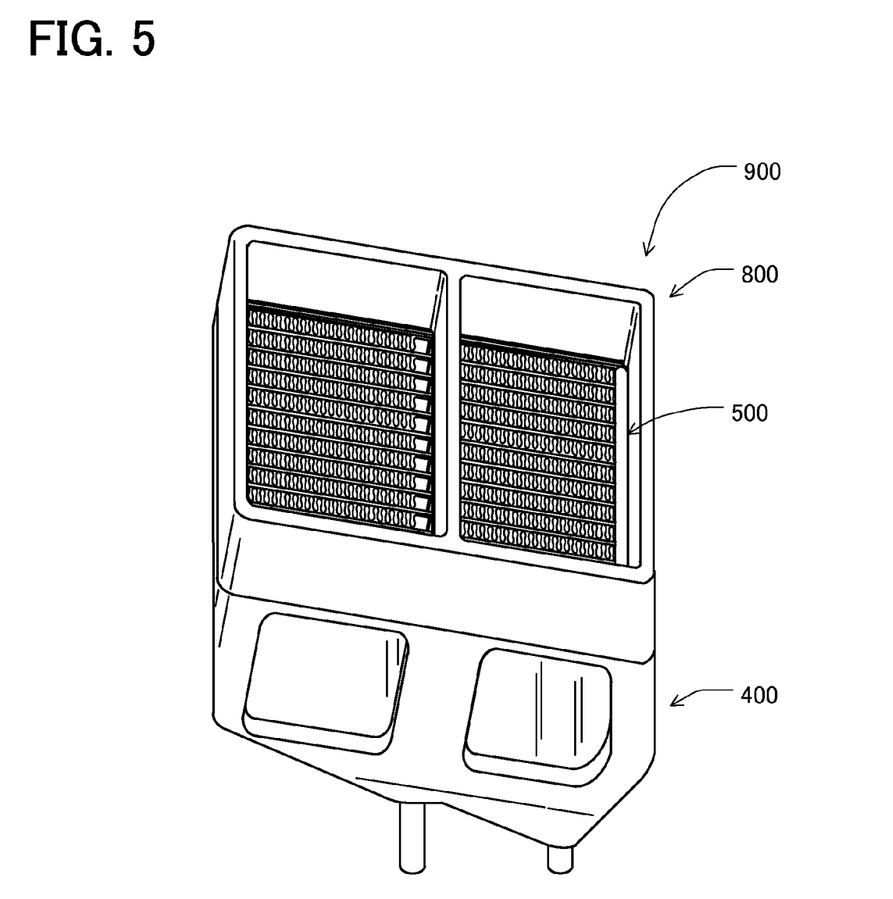
FIG. 5 is a perspective exploded view showing the evaporator, the case, and the passage member assembled into an evaporator unit.

The evaporator 500 is installed to the case 400. Specifically, the evaporator 500 may be placed on the upper surface of the partition and the step 405 of the case 400. Thus, the evaporator 500 is located within the side wall of the case 400. Further, the passage member 800 is placed on the evaporator 500 and the case 400. The partition wall 5 of the evaporator 500 is mated with both the first partition 430 of the case 400 and the second partition 830 of the passage member 800. Thus, as shown in FIG. 5, the passage member 800, the evaporator 500, and the case 400 are assembled into an evaporator unit 900 as one component.

Figure 6:
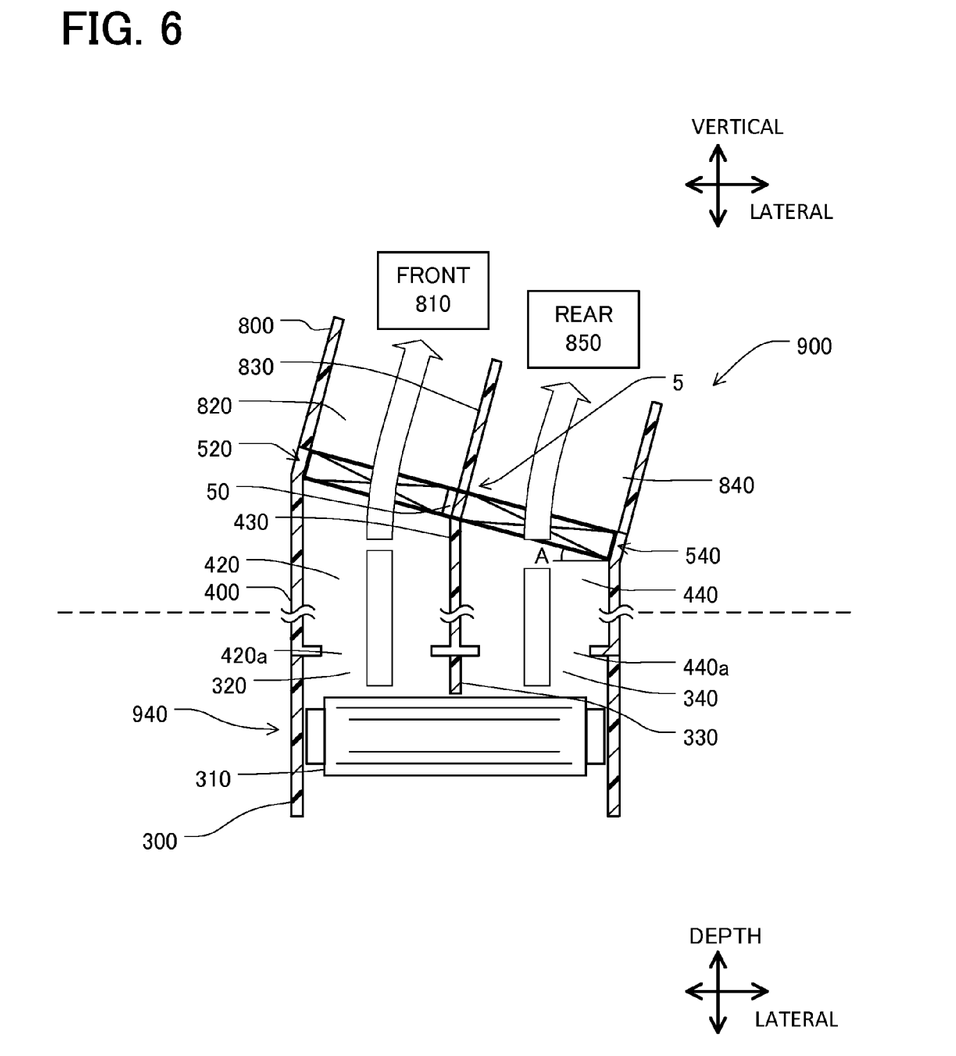
FIG. 6 is a schematic view showing the evaporator unit and a blower unit.

As shown in FIG. 6, the case 400 is further equipped with a blower unit 940 including a blower. FIG. 6 is a schematic view including an upper section above the dotted line and a lower section below the dotted line. The upper section shows the evaporator unit 900 viewed along the depth direction. The lower section shows the side wall of the evaporator unit 900 and the blower unit 940 viewed along the vertical direction.

The blower unit 940 includes a blower case 400 accommodating a blower 310. The blower case 400 has a blower partition 330 separating the interior of the blower case 400 into a first passage 320 and a second passage 340. The first passage 320 and the second passage 340 in the blower unit 940 are communicated with the first passage 420 and the second passage 440 in the case 400 through the first inlet 420a and the second inlet 440a, respectively.

The first passage 420 and the second passage 440 in the case 400 are further communicated with the first passage 820 and the second passage 840 in the passage member 800 through the first section 520 and the second section 540 of the evaporator 500, respectively.

A heater core and doors (none shown) are provided at the downstream of the first section 520 and the second section 540 of the evaporator 500 to heat air after passing through the evaporator 500 and to conduct the air into a front compartment 810 and a rear compartment 850 separately in the vehicle.

The blower 310 blows air through the first passages 320 and 420 and the second passages 340 and 440, through the first section 520 and the second section 540 of the evaporator 500, and further through the first passage 820 and the second passage 840. Thus, the air flowing through the first section 520 and the air flowing through the second section 540 are conditioned, i.e., cooled separately. Thus, the conditioned air is conducted toward the front compartment 810 and the rear compartment 850 separately. In the present configuration, the partition wall 5 functions to restrict air from crosstalk (leakage) between the first passages 420 and 820 and the second passages 440 and 840.

The evaporator 500 is inclined at an angle A relative to the lateral direction. When the evaporator 500 is installed in the vehicle, the width direction of the evaporator 500 is at the angle A relative to the direction of gravitational force. The main surface of the evaporator 500 opposed to the flow direction of air is at the angle A relative to the lateral direction.

Figure 7:
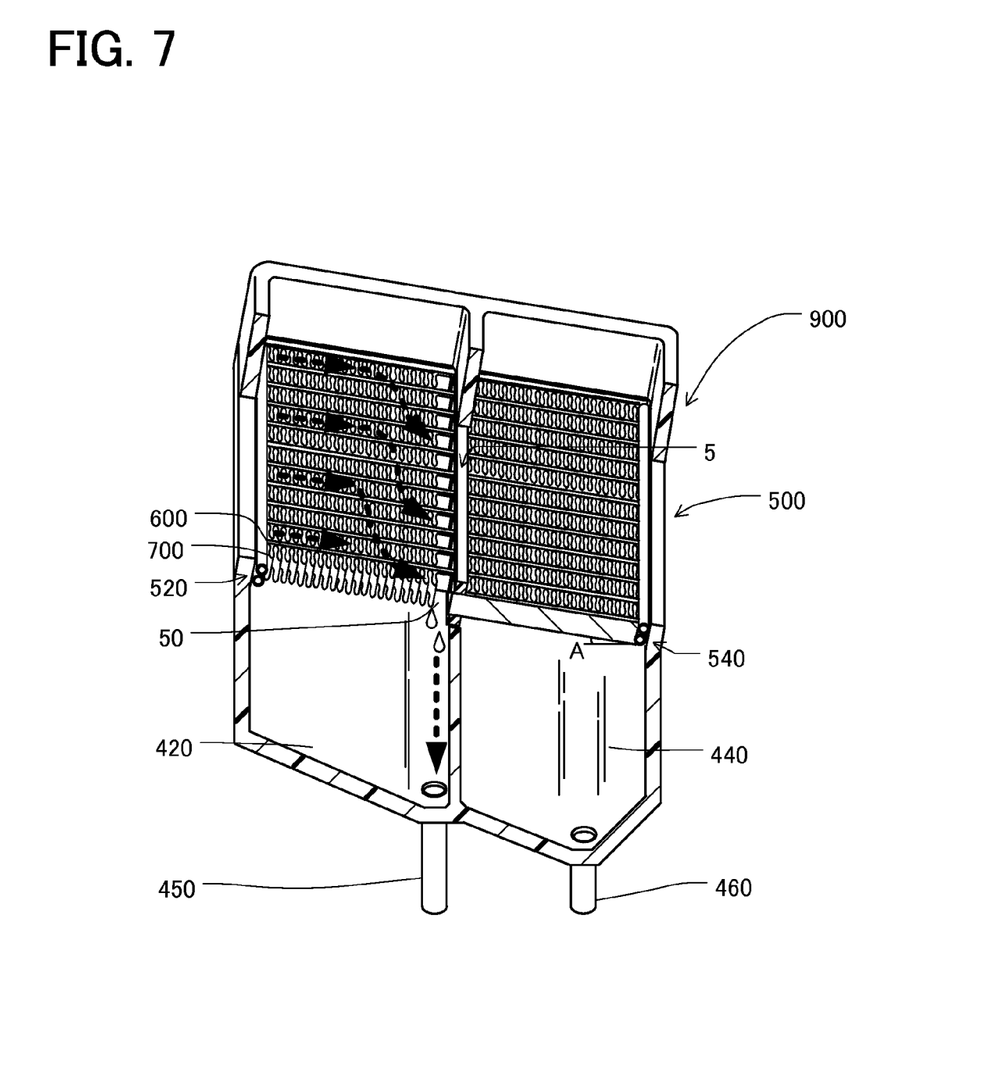
FIG. 7 is a sectional view showing the evaporator unit.
Figure 8:
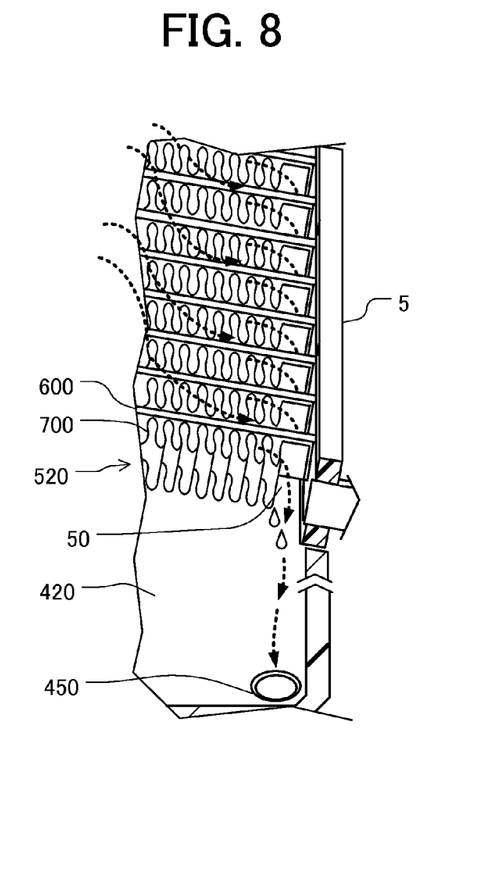
FIG. 8 is an enlarged sectional view showing the evaporator unit.

As shown in FIGS. 7 and 8, as the evaporator 500 cools air, moisture contained in the air may be condensed into condensate in a liquid form. Condensate may adhere on the fins 700 and tubes 600 and may accumulate on the evaporator 500. The evaporator 500 is inclined at the angle A. Therefore, condensate may flow on the first section 520 of the evaporator 500 toward the partition wall 5. The first section 520 has the drain passages 50 adjacent to the partition wall 5. The drain passage 50 is located on the upstream side of the partition wall 5 relative to the flow direction of the condensate formed on the evaporator 500.

Thus, the drain passages 50 may enable condensate to flow downward therethough, before the condensate reaches the partition wall 5. Condensate may form a drip trickled into the first passage 420. Thus, trickled drip is flown toward the first tube 450 and is discharged out of the evaporator unit 900. Condensate may be also formed on the second section 540. The condensate may move downward through the second section 540. Thus, the condensate may form a drip trickled into the second passage 440. Thus, trickled drip is flown toward the second tube 460 and is discharged out of the evaporator unit 900. The drain passage 50 may have a large width enough not to allow condensate to form a water film due to surface tension. Thus, the drain passage 50 may restrict condensate from accumulating around the drain passage 50 and the partition wall 5.

Figure 9:
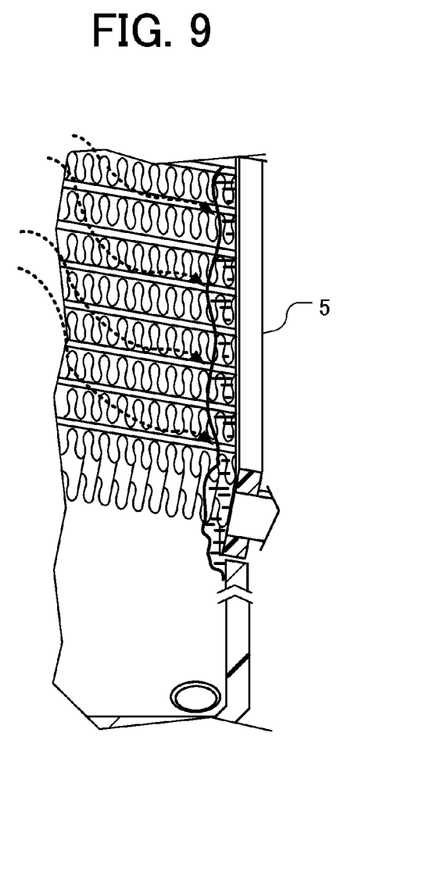
FIG. 9 is an enlarged sectional view showing an evaporator unit according to a comparative example.

FIG. 9 shows a comparative example of an evaporator without the drain passage. In the configuration of FIG. 8, condensate may flow toward the partition wall 5, and the condensate may be dammed on the partition wall 5. Dammed condensate may accumulate around the partition wall 5. Consequently, accumulating condensate may be overcooled on the evaporator and may be frozen on the partition wall 5.

Figure 10:
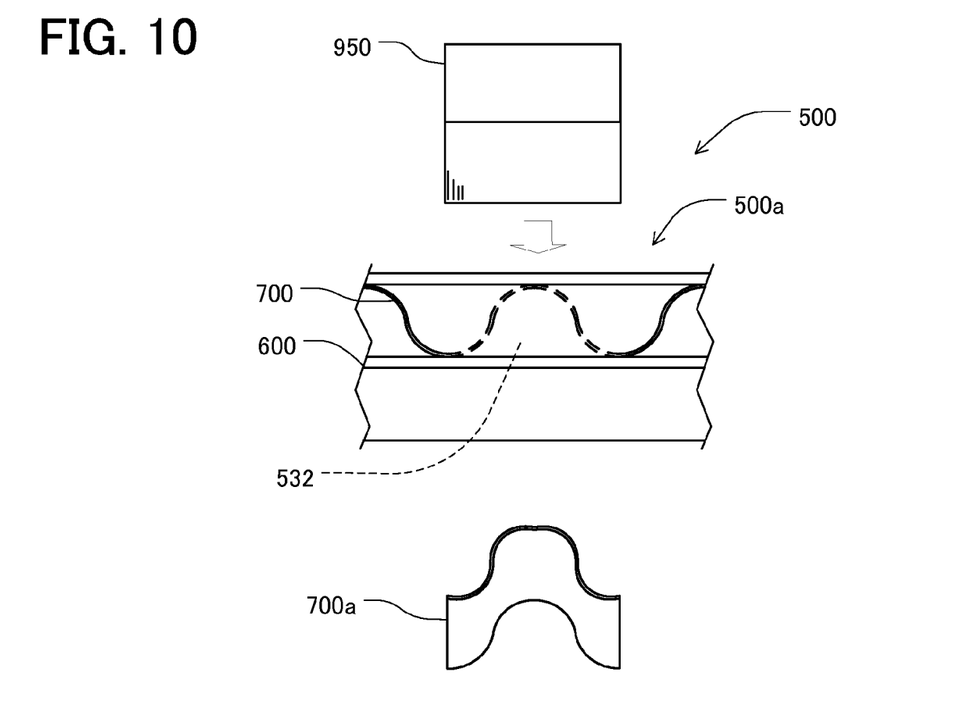
FIGS. 10 and 11 are schematic perspective views each showing a forming process of a clearance of the evaporator unit.

As shown in FIG. 10, the fins 700 and the tubes 600 may be, for example, stacked and brazed first to form the core 500a of the evaporator 500. Subsequently, a die 950 may be rammed into the fins 700 thereby to pre-punch the fins 700. The die 950 may be in a comb shape correspondingly to the inert 10 and 60. The die 950 may be positioned at the location corresponding to the intermediate section 530. Subsequently, the die 950 may be pressed onto the fins 700 to cutout the fin portions 700a from the fins 700 to form the clearances 532. Thus, the clearances 532 enable insertion of the insert 10 and 60 and formation of the drain passages 50.

Figure 11:
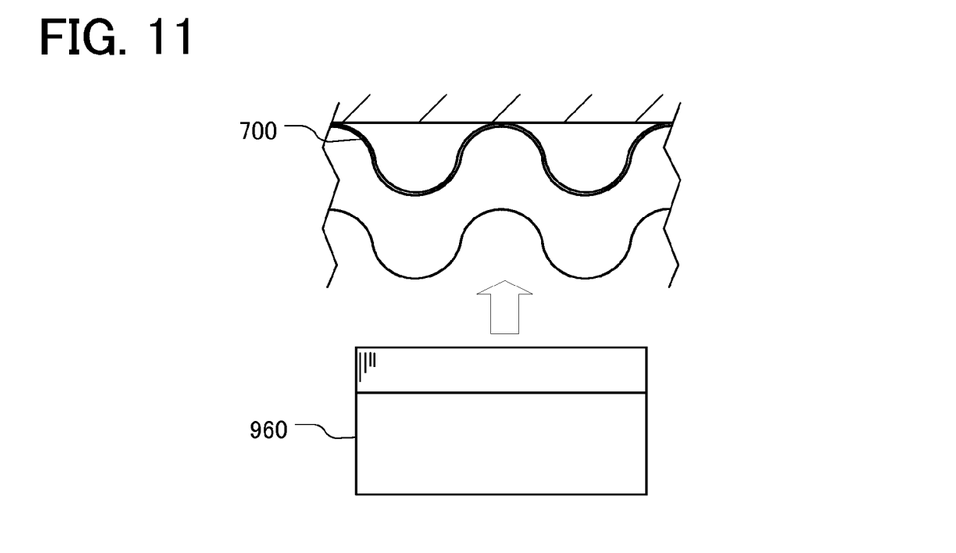

As shown in FIG. 11, the fins 700 may be crushed by pressing a die 960, and thereafter, the fins 700 and the tubes 600 may be, for example, stacked and brazed first to form the core 500a.

Alternatively or in addition, each fin 700 of the first section 520 may be cut into short strips. The short strips may be opposed to each other to form the clearance 532 therebetween, and the short strips may be interposed between the tubes 600. In this way, the clearances 532 may be formed between the first section 520 and the second section 540, without punching or crushing the fins 700.

Other Embodiment

The second section 540 of the evaporator 500 may have drain passages similarly to the first section 520. Specifically, the drain passages may be adjacent to the tank 550 on the downstream side of condensate. When the evaporator 500 is installed in the vehicle, may have the drain passages 50 is located on the lower side, i.e., on the opposite side of the partition wall 5. Condensate formed on the second section 540 may flow toward the lower side. Thus, the condensate may be drained through the drain passages in the second section 540.

The fore insert 10 and the rear insert 60 may be integrated into a single piece having all the blades 20 and 70 enough to form the partition wall 5 to partition the first section 520 from the second section 540. In this case, the integrated insert may be inserted to the intermediate section 530 from only one direction. The insert may be formed of a metallic material, such as aluminum alloy, by casting or stamping.

The blades of the insert may be inserted into clearances, which are originally formed between the wave-shaped fins 700 and the tubes 600, such that the clearances leave the drain passages.

The configurations of the present disclosure are not limited to application in the evaporator 500 and may be employed in various heat exchangers such as a condenser and/or radiator. The configuration of the present disclosure may be employed in a heat exchanger for an exterior and interior two-layer air conditioning system. In this case, the heat exchanger may be partitioned for separating exterior air passage and an interior air passage.

For purposes of clarity, the same reference numbers will be used in the drawings to identify similar elements. As used herein, the phrase at least one of A, B, and C should be construed to mean a logical (A or B or C), using a non-exclusive logical or.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A heat exchanger comprising:
a plurality of tubes;
a plurality of fins stacked alternately with the tubes to form a core including a first section and a second section; and
a partition wall partitioning between the first section and the second section, wherein
the first section has a plurality of drain passages adjacent to the partition wall,
the drain passages have a width,
the width is greater than a fin pitch of the fins in a lateral direction of the tubes, wherein the fin pitch is a length between two peaks of the fin in the lateral direction,
the partition wall includes a first insert inserted between the first section and the second section,
the first insert is in a comb shape and includes a first base and a plurality of first blades,
the first blades are extended from the first base, and
each of the first blades inserted between two adjacent tubes;
the partition wall further includes a second insert inserted between the first section and the second section,
the second insert is in a comb shape and includes a second base and a plurality of second blades,
the second blades are extended from the second base,
each of the second blades inserted between two tubes, which are adjacent to each other, and
the first insert and the second insert are opposed to each other.

2. The heat exchanger according to claim 1, wherein two of the tubes, which are adjacent to each other, define one of the drain passages therebetween.

3. The heat exchanger according to claim 2, wherein the tubes are exposed on a side of one of the drain passages, without being in contact with the fins.

4. The heat exchanger according to claim 1, wherein two of the tubes, which are adjacent to each other, the partition wall, and a fin end of the fins define one of the drain passages thereamong.

5. The heat exchanger according to claim 1, wherein the drain passages and the tubes are arranged alternately.

6. The heat exchanger according to claim 1, wherein each of the fins and one of the tubes form an air passage, and each of the drain passages is, in shape, different from a shape of the air passage.

7. The heat exchanger according to claim 1, wherein
the first blades and the second blades are arranged alternately, and
each of the first blades and its corresponding second blades are located at a same level.

8. The heat exchanger according to claim 1, wherein the core is a part of an evaporator configured to cool air flowing therethrough, and the drain passages are configured to conduct condensate, which is formed on the core, therethrough.

9. The heat exchanger according to claim 1, wherein the core is inclined at an angle.

10. The heat exchanger according to claim 9, wherein the drain passages are located on a lower side in the first section relative to a gravitational direction.

11. A heat exchanger comprising:
a plurality of tubes;
a plurality of fins stacked alternately with the tubes to form a core including a first section and a second section; and
a partition wall partitioning between the first section and the second section, wherein
the first section has drain passages in the vicinity of the partition wall,
each of the drain passage has a width, and
the width is greater than a fin pitch of the fins in a lateral direction of the tubes, wherein the fin pitch is a length between two peaks of the fins in the lateral direction; wherein
the partition wall includes a first insert inserted between the first section and the second section, the first insert is in a comb shape and includes a first base and a plurality of first blades,
the first blades are extended from the first base, and
each of the first blades inserted between two adjacent tubes; the partition wall further includes a second insert inserted between the first section and the second section,
the second insert is in a comb shape and includes a second base and a plurality of second blades,
the second blades are extended from the second base, each of the second blades inserted between two tubes, which are adjacent to each other, and the first insert and the second insert are opposed to each other.

\* \* \* \* \*